United States Patent [19]

Colosimo et al.

[11] Patent Number: 5,198,237
[45] Date of Patent: Mar. 30, 1993

[54] EXTRUSION DIE ARRANGEMENT FOR ATTACHMENT TO A FOOD GRINDER

[76] Inventors: Ernest Colosimo, 3336 S. 8280 West, Salt Lake City; Gabriel A. Colosimo, 8480 W. 3500 South, Magna, both of Utah 84044

[21] Appl. No.: 617,687

[22] Filed: Nov. 26, 1990

[51] Int. Cl.⁵ .................. B29C 47/12; B29C 47/08; A23N 15/00; A22C 7/00

[52] U.S. Cl. .................. 425/113; 425/122; 425/190; 425/376.1

[58] Field of Search .................. 425/376.1, 382, 464, 425/190, 191, 461, 518, 511, 378.1, 297, 311, 145, 113, 155, 161, 122, 113, 305.1; 99/353, 484; 241/82.1, 825; 426/503, 516

[56] References Cited

U.S. PATENT DOCUMENTS

| | | | |
|---|---|---|---|
| 1,221,594 | 4/1917 | Richman | 425/311 |
| 1,226,642 | 5/1917 | Demovitsch | 425/311 |
| 2,209,824 | 7/1940 | Louisot et al. | 425/461 |
| 2,213,772 | 9/1940 | Strain | 425/376.1 |
| 2,545,451 | 3/1951 | Elsaesser | 425/113 |
| 2,572,677 | 10/1951 | Tench | 425/461 |
| 2,694,222 | 11/1954 | Spang | 99/353 |
| 2,771,636 | 11/1956 | McIntosh et al. | 425/190 |
| 2,795,816 | 6/1957 | Spang et al. | 425/376.1 |
| 2,806,247 | 9/1957 | Shadid | 425/376.1 |
| 2,808,614 | 10/1957 | Renero | 425/376.1 |
| 2,810,155 | 10/1957 | Spang | 425/376.1 |
| 2,817,873 | 12/1957 | Spang et al. | 425/464 |
| 2,879,543 | 3/1959 | McDermott | 425/191 S |
| 2,967,555 | 1/1961 | Baker | 241/82.5 |
| 3,224,041 | 12/1965 | Reynolds | 425/463 |
| 3,259,938 | 7/1966 | Martin | 425/464 |
| 3,727,308 | 4/1973 | Ross | 425/311 |
| 4,118,167 | 10/1978 | Lund et al. | 425/463 |
| 4,124,346 | 11/1978 | Greewood et al. | 425/461 |
| 4,148,598 | 4/1979 | Colosimo et al. | 425/464 |
| 4,233,018 | 11/1980 | Chinfen | 425/464 |
| 4,293,979 | 10/1981 | Colosimo et al. | 425/464 |
| 4,395,217 | 7/1983 | Benadi | 425/464 |
| 4,563,140 | 1/1986 | Turecek | 425/461 |
| 4,614,489 | 9/1986 | Juravic | 425/382 R |
| 4,685,879 | 8/1987 | Dürstiner et al. | 425/461 |
| 4,781,564 | 11/1988 | Cerrone | 425/297 |
| 4,906,486 | 3/1990 | Young | 428/518 |

Primary Examiner—Willard Hoag

[57] ABSTRACT

A die arrangement that will attach to the discharge of a conventional grinding or extruding machine to shape discharged food product onto a ramp and including means to secure a forming block to a distributor member to feed foodstuffs to the forming block and an adapter to selectively seal the connections between the adapter, distributor member and forming block and to release such sealing engagement for easy removal and replacement of the forming block.

13 Claims, 3 Drawing Sheets

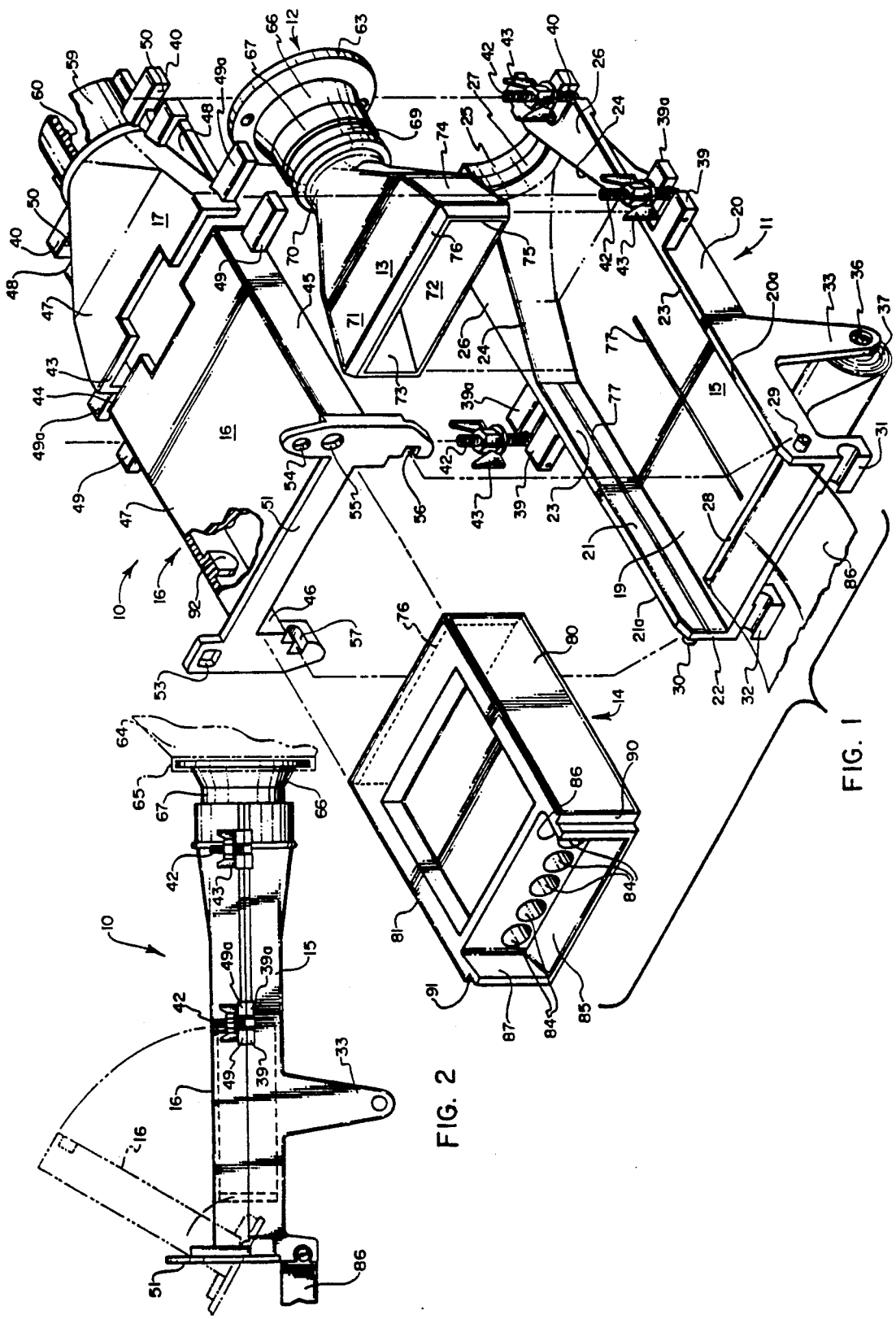

EXTRUSION DIE ARRANGEMENT FOR ATTACHMENT TO A FOOD GRINDER

BACKGROUND OF THE INVENTION

1. Field of the Invention

This invention relates to forming presses through which foodstuffs are shaped.

2. Prior Art

U.S. Pat. Nos. 4,148,598 and 4,293,979, disclose forming presses used for forming foodstuffs and particularly meat products. These patented presses are used with grinding machines that grind foodstuffs and force the ground product into the food presses. The patented presses are usable for the intended purpose of forming foodstuffs and of coupling to a grinding machine. They utilize insert members that determine product shape and have proven very effective for use with many grinding and extrusion machines.

The present invention constitutes an improvement on the forming presses disclosed in the aforementioned U.S. Patents.

OBJECTS OF THE INVENTION

Principal objects of the present invention are to provide a food press that can be easily adapted for use with a wide variety of food grinding and extrusion machines, and that is easily installed on and removed from such machines.

Other objects are to provide a food press that is easy to clean, that will not allow foodstuffs being forced therethrough to escape and that uses a distributor member to feed into a shaping block that can be easily changed, while the food press is attached to a food grinder or extrusion machine, to thereby change the configuration of the discharged product.

FEATURES OF THE INVENTION

Principal features of the invention include a distributor with an inlet end adapted to be threaded into an adapter that is specially constructed to fit on the discharge end of a standard food grinder or extrusion machine.

A forming block receives foodstuffs from the distributor and means are provided to secure the discharge end of the forming block to the distributor. The securement means provided to secure the discharge end of the forming block to the distributor preferably provides for releasable attachment and may comprise a multi-part housing within which the distributor and block may fit or may comprise a leak proof locking system between the discharge end of the distributor and the inlet end of the block.

The securement means comprising a multi-part housing with an inlet end to receive a rotatable adapter; a distributor member having an inlet threaded into the adapter and an outlet with a beveled edge to mate with a beveled edge on an inlet to a forming block that slides inside the housing into engagement with curved stops on a housing cover part that is pivotally coupled to a housing base part. Upon engagement of the forming block with the stops the discharge end of the forming block is aligned with a paper feed slot so that discharged product will feed onto and pull paper from a roll supported by the housing to slide onto a discharge ramp attached to the housing.

A cover part of the housing may be of one piece, which may have score line guides to permit proper cutting into two sections, or the cover part may be two sections, with one section removable to facilitate forming block removal and replacement. A cut-out window in the cover part permits observation of the coupling between the distributor member and forming block.

When the securement means comprises a leak proof locking system between the discharge end of the distributor and the inlet end of the block matching guideways and slide flanges are preferably provided on the distributor and block and clamping means interlock the members.

Other objects and features of the invention will become apparent from the following detailed description and drawings disclosing what are presently contemplated as being the best modes of the invention.

THE DRAWINGS

In the drawings:

FIG. 1 is an exploded perspective taken from just above and at the discharge end of one embodiment of the forming press of the invention;

FIG. 2, a side elevation view of the forming press of the invention and including the receiving ramp (shown fragmentarily), paper roll holder, and coupling for a food grinder or extruder;

FIG. 3, a perspective view of another embodiment of forming block;

FIG. 4, still another embodiment of forming block;

FIG. 5, another embodiment of forming press with still another embodiment of forming block, shown assembled;

FIG. 6, an exploded perspective view of the forming press of FIG. 5, with yet another forming block;

FIG. 7, an exploded perspective view of a distributor with an insertable forming block; and FIG. 8, a fragmentary perspective view of a preferred embodiment of receiving ramp.

DETAILED DESCRIPTION OF THE INVENTION

Figure 3:
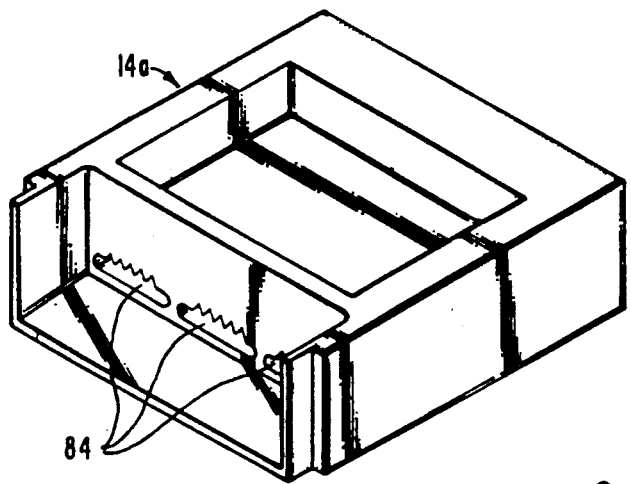

Referring now to the drawings:

In the illustrated preferred embodiment, the forming press of the invention, shown generally at 10, includes a multi-part housing 11, an adaptor 12, a distributor member 13 and a forming block 14.

The housing 11 includes a base 15 and a top cover, which may be of two parts 16 and 17. Alternatively, the two parts 16 and 17 may be made integral and may have a score line guide formed to indicate where the cover may be cut to form a single piece cover into two parts. The choice of a one-piece or a two part cover is determined by the intended manner of use of the press 10, as will be further explained, but the means for securing the cover to the base 15 will secure either a one-piece or a two part cover.

Base 15 of housing 11 has a bottom 19 and upstanding sidewalls 20 and 21. The sidewalls 20 and 21 each extend from a discharge end 22 of the housing straight and parallel at 23 for a portion of the base length and then are angled and curved inwardly at 24 to terminate in a half collar 25. A flange 26 extends outwardly from each sidewall 20 and 21 to form continuations of the upper edges 20a and 21a of the sidewalls 20 and 21.

Half-collar 25 is of semi-circular configuration and has a ridge 27 therein.

A paper slot 28 is formed through the bottom 19, is spaced just inwardly of the end 22.

Pivot lugs 29 and 30 extend outwardly from the ends of sidewalls 20 and 21 at the end 22 and ramp hooks 31 and 32 extend from beneath the bottom 19 and the lugs 29 and 30, respectively.

Figure 5:
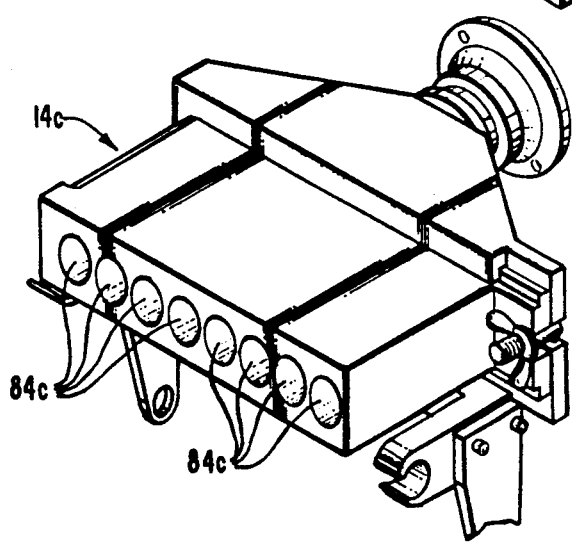

Paper hanger arms 33 extend downwardly from bottom 19, intermediate its length and beneath sidewalls 20 and 21. A hole 35 is provided through each arm 33 to receive a spindle 36 (FIG. 5) inserted through a roll of paper 37.

Pairs of spaced apart ears 39 and 39a extend outwardly from the sidewalls 20 and 21 intermediate the lengths of the walls and grooves 40 are formed in the flanges 26. Pivot shafts 41 extend through the adjacent ears 39 and across the grooves 40 to pivotally support locking bolts 42, having wing nuts 43 threaded thereon.

The top cover parts 16 and 17, when arranged end to end, with the discharge end 43 of part 17 against the inlet end 44 of part 16 form a top cover with sidewalls 45 and 46 that mate with the sidewalls 20 and 21 and a top wall 47. Flanges 48 extend outwardly from the sidewalls 45 and 46 to mate with the flanges 26 of the base 15. Similarly ears 49 projecting from the sidewalls 45 and 46 of part 16 mate with ears 39 of base 15, ears 49a projecting from the sidewalls 45 and 46 mate with ears 39a of base 15, and grooves 50 in the flanges 48 align with the grooves 40. Thus, when the top cover is assembled on the base 15 the locking bolts 42 are pivoted to extend between the ears 49 and 49a and into the grooves 50 and the wing nuts 43 are tightened thereon to secure the top parts 16 and 17 (or a single piece cover, if used) securely to the base.

The top cover has a flange 51 extending across the discharge end of top wall 47, outwardly of sidewalls 45 and 46 and downwardly therefrom. Holes 53, 54 and 55, through the flange 51, are shaped and positioned to fit over alignment projections, not shown, on standard commercial grinding and extrusion machines.

Slots 56 and 57 formed in the inside bottoms of the flange 51 are rounded at their innermost ends to engage the round lugs 29 and 30 as the top cover is positioned on the base.

The sidewalls 45 and 46 and top wall 47 are curved into a half-collar 59 of semi-circular configuration and having a ridge 60 formed therein. The half-collar 59 mates with the half-collar 25, when the top cover is fitted on the base, to form a fully encircling collar with a ring-shaped ridge formed by the ridges 27 and 60.

The adapter 12 includes a flange 63 at its inlet end that connects to the outlet end of a food mixer or extruder, such as is shown fragmentarily at 64 and that may be attached by a coupler collar 65, FIG. 3. The flange 63 is connected by a tapered section 66 to a barrel 67 forming the discharge end of the adapter. Barrel 67 is interiorly threaded and has a groove 69 formed therearound. When the press 10 is assembled the barrel 67 fits into the half-collars 25 and 59 and the ridges 27 and 28 extend into the groove 69.

The distributor member 13 has a tubular inlet 70 with exterior threads thereon to mate with the interior threads of adapter 12, when the inlet 70 is threaded into barrel 67.

Inlet 70 is flared outwardly to top and bottom walls 71 and 72, respectively, interconnected by sidewalls 73 and 74 and the sidewalls are flared to a discharge opening 75 of generally rectangular configuration. The edge of opening 75 is beveled exteriorly at 76 to mate with a beveled interior edge 76 surrounding the inlet end of forming block 14.

Forming block 14 has a body 79 with parallel sidewalls 80 and 81 that fit between the sidewalls 20 and 21 of base 15 and sidewalls 45 and 46 of top cover parts 16 and 17. The forming block slides on parallel ridge 77 formed on the bottom 19 and inside faces of walls 20 and 21.

One or more shaping passages 84 extend through the body 79. As shown in FIG. 1, five round passages are provided to simultaneously form five shaped items. Such a block is particularly adapted to the forming of larger Italian sausage links, for example. In the embodiment shown, the food items formed through the forming block each have a round cross sectional configuration. It will be apparent that more or fewer passages can be provided and that many different cross sectional shapes may be utilized.

Forming blocks having different shaping passages are shown in FIGS. 3 through 7. In FIG. 3, a shaping block 14a has a plurality of flattened passages 84a having small ribs thereon. Such a forming block is well suited for making meat jerky, for example.

Figure 4:
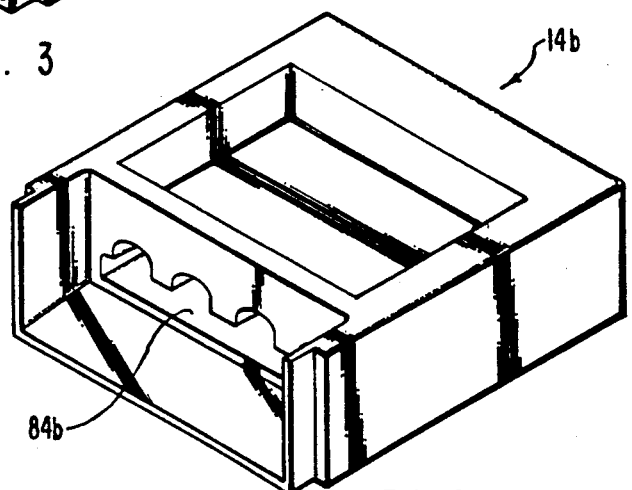

In FIG. 4, there is shown a forming block 14b having a single shaping passage 84b that is flattened, but with larger ribs than are shown in the forming block 84a. Such a forming block is well suited for use in making meat patties with ribs extending lengthwise thereof.

Figure 7:
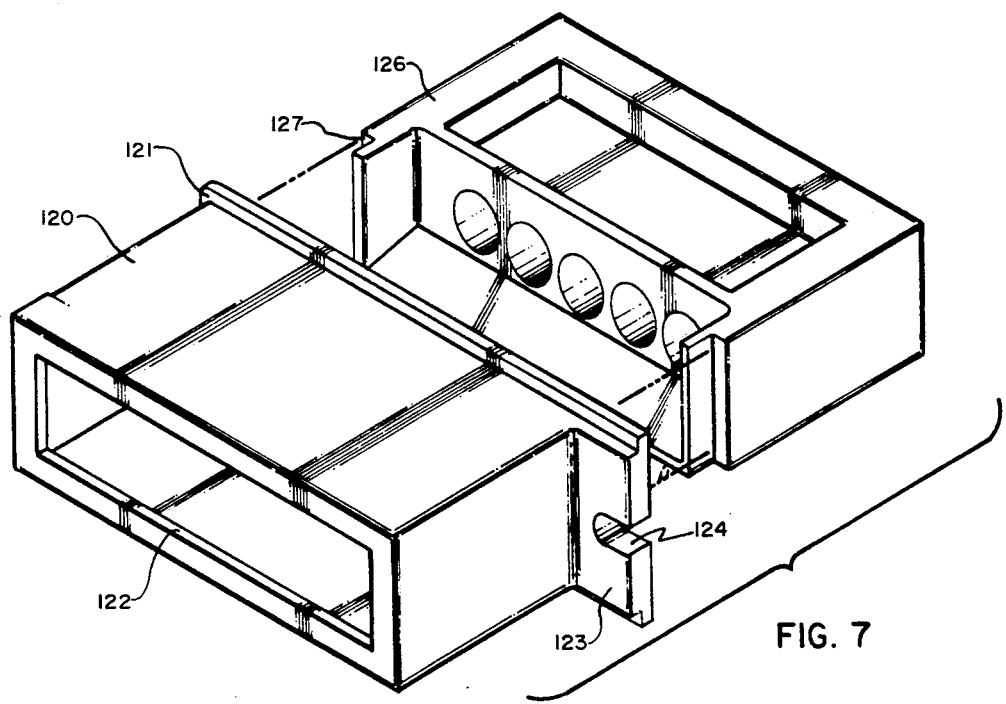

In FIG. 7, a forming block 14c is shown constructed for use with another embodiment of food press to be hereinafter described in detail. The block 14c, as shown, has eight forming passages 84c of circular cross-section and having a diameter smaller than that of the passages 84.

Figure 6:
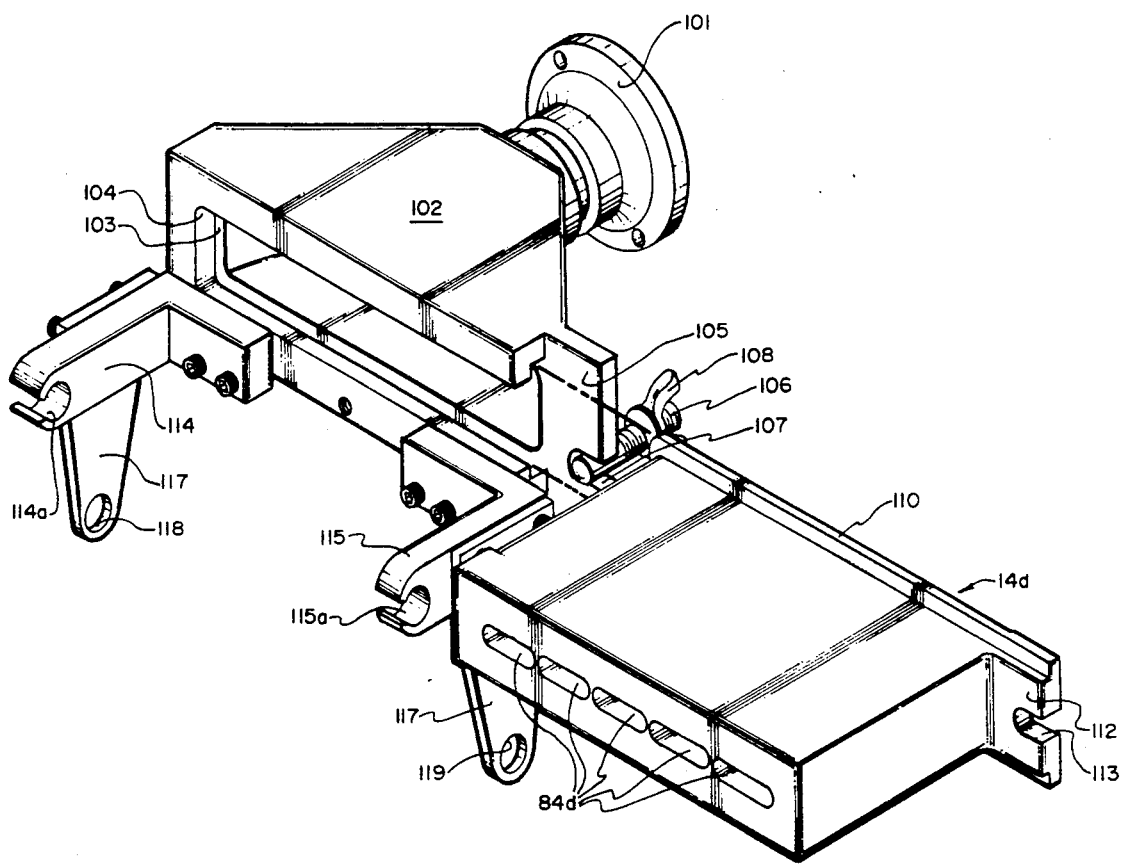

Forming block 14d, shown in FIG. 6, has a plurality of parallel flattened passages 84d. It will be apparent that still other cross-sectional configurations can be provided through the forming blocks of the invention, should this be desired.

The discharge end of the forming block 14 has a downwardly sloped slide 85 and inwardly angled side wing surfaces 86 and 87. The ramp 85 directs product emerging from the shaping passage or passages downwardly across slide 85 onto paper from roll 37 threaded through slot 28 and onto a ramp 86. The frictional engagement of the product with the paper pushes the paper onto and along ramp 86 and off roll 37 as the food product is deposited thereon in a continuous ribbon or a plurality of continuous ribbons having a cross-sectional configuration corresponding to the shape of the shaping passage or passages of the forming block used.

The inwardly angled side wing surfaces 86 and 87 compose the foodstuffs discharging from the passages 84 and directs it onto the paper.

Shoulders 90 and 91 formed at the discharge ends of sidewalls 80 and 81 of forming block 14 engage stops 92 formed on the inner sidewalls 45 and 46 of cover 16 to position the forming block with the edge of slide 85 of the block adjacent to the slot 28.

In practice, the press 10 is assembled by threading distributor member 13 into the adapter 12, positioning the distributor member in base 15 and groove 69 over the half ring 27 and 60. A selected forming block, such as block 84, is placed in the base 15 between the distributor member 13 and stops 92. The top cover is positioned and secured and the adapter member is rotated to screw the distributor member 13 out of the collar, to thereby force the beveled edge 76 into sealing engagement with the beveled edge 76a of the forming block and the forming block shoulders 90 and 91 against the stops 92. The press can then be attached to the grinding or extruding machine to be used by coupling ring 65. The roll of paper 37 is positioned and the leading edge thereof is fed through the slot 28 and onto the ramp 86, which is attached as previously described.

It will be apparent that it is a simple matter to change the forming block or to clean the press without even removing it from the grinding or extruding machine. It is only necessary to turn the coupler 65 to move the adapter 12 away from the forming block and to then remove the cover plate or the part 16 thereof before removing the forming block and insertion of another block.

A window opening 99 is preferably formed through the top cover to permit viewing of the seal between the distributor member 13 and forming block 14. Thus, the user can readily determine that no leakage is occurring.

In the embodiment of the invention shown in FIG. 6, an adapter 100 is shown threaded onto the inlet end 101 of a distributor member 102. A coupler, not shown, but like the coupler 65, previously described, may be used to secure the adapter 100 to the discharge end of a food mixer or extruder, such as shown at 64 in FIG. 2.

The distributor member 102 has a groove 103 formed in the body thereof and inside and at the top, bottom and one end of a discharge opening 104. A flange 105 projects outwardly of the body at the other end of the discharge opening. A threaded locking bolt 106 is pivotally mounted in a notch 107 in the flange 105 and a wing nut 108 is threaded onto the bolt 106.

A forming block 14d has a plurality of forming passages 84d therethrough, as previously described. The block 14d also has a shoulder 110 extending outwardly from the body of the block at an inlet end thereof. The shoulder 110 extends around the top, bottom and one end of the forming block and is adapted to slide snugly into the slot 107. A flange 112 extends outwardly of the body of block 14d at the other end of discharge opening 104 and has a notch 113 formed therein. The notch 113 aligns with the notch 107 when the shoulder 110 is inserted fully into the groove 102, bolt 106 is pivoted into the notch 113 and wing nut 108 is tightened to secure the block 14d in the groove 103.

Foodstuff discharged through distributor member 102 is forced through the passages 84d of the forming block, when the forming block is assembled on and secured to the discharge end of the distributor member 102.

A pair of arms 114 and 115 extend from opposite sides of the face of distributor member 32 and the arms have hooks 114a and 115a in the ends thereof to receive support lugs of a ramp 86. Legs 116 and 117 project downwardly from arms 114 and 115, respectively and have holes 118 formed therein to receive an axle 36 of a roll of paper such as is shown in FIG. 1.

As shown best in FIG. 7, a composite distributor member allows for easy change of the forming passages to form foodstuffs of desired extruded shape. As shown, a casing 120 has the same general exterior configuration as the forming block 14d, shown in FIG. 6, and including a flange 121 similar to the flange 110 previously described, but including a flange 122 extending fully around a discharge end of the casing.

A forming cartridge 126 having a general configuration corresponding to the forming block 14 of FIG. 1, slides snugly into the casing 120 from the inlet end of the cartridge until shoulders 127 at the discharge end of the cartridge engage flange 122. When the cartridge, which may have any desired number of passages of any desired cross-sectional configuration, is inserted into the casing 120 and the casing 120 is attached to a food grinder or extruder, foodstuff discharged through the cartridge will have the cross-sectional configuration of the passage or passages through the cartridge.

Figure 8:
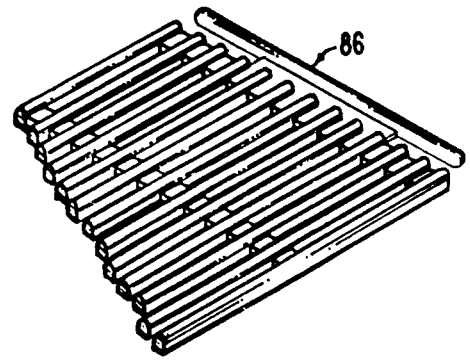

As shown best in FIG. 8, the ramp 86 (also shown fragmentarily in FIG. 2), is preferably molded from plastic or the like, with parallel, spaced apart, longitudinal ribs, having rounded tops, interconnected on their back sides by spaced apart, transverse braces. A pair of outwardly extending lugs, formed at one end of the ramp fit into the holes (such as shown at 118) of the support arms provided therefor and extending from the forming press.

The spaced apart rounded ribs provide a surface for the paper fed thereonto from a paper roll, such as that at 37, that is smooth and that will permit easy paper travel thereon as foodstuff is ejected onto the paper. The spaced apart ribs also allow for rapid cooling of the foodstuffs after the ramp, with the foodstuffs thereon is placed in a freezer or refrigerator, prior to cutting of the continuous ribbons of foodstuffs into desired lengths.

Although a preferred form of our invention has been herein disclosed, it is to be understood that the present disclosure is by way of example and that variations are possible without departing from the subject matter coming within the scope of the following claims and a reasonable equivalency thereof, which subject matter we regard as our invention.

We claim:

1. A food forming apparatus comprising a housing; a forming block having at least one passage therethrough insertable into and removable from the housing; an adapter releasably coupled to the housing; and means connected to the adapter for releasably connecting said adapter to the discharge of a food grinder or extruder.

2. A food forming apparatus as in claim 1, wherein the housing has a removable portion; the forming block is insertable into and removable from the housing through removal of the removable portion; the adapter extends into the housing and is a means for coupling to the discharge of a food grinder or extruder; and further including a distributor member between said forming block and said adapter in the housing; and means to releasably seal said adapter to the forming block.

3. A food forming apparatus as in claim 1, wherein the means for connecting the adapter to a food grinder or extruder includes a plate member having means therein to be secured to the food grinder or extruder and a threaded end; a collar rotatably secured to the distributor member and threaded to the threaded end of the plate member.

4. A food forming apparatus as in claim 2, wherein the means for connecting the adapter to a food grinder or extruder includes a plate member having means therein to be secured to the food grinder or extruder and a threaded end; a collar rotatably secured to the distributor member and threaded to the threaded end of the plate member.

5. A food forming apparatus as in claim 1, wherein the housing has attachment means on the face thereof; and wherein the forming block has securement means on an inlet end thereof to releasably couple to the attachment means.

6. A food forming apparatus as in claim 5, wherein the forming block includes an exterior casing having means thereon to releasably couple to the attachment means and a forming cartridge removably inserted into the casing, said forming cartridge having at least one forming passage therethrough.

7. A food forming apparatus as in claim 1, wherein the housing further includes a pair of legs depending therefrom to support a roll of paper; a pair of arms projecting from therebeneath; and a ramp having one end removably attached to the pair of arms.

8. A food forming apparatus as in claim 2, wherein the housing includes a base having a half-collar with a groove therein; a cover removably secured to the base and having a half-collar with a groove therein and means to removably secure the cover to the base whereby the groove in the half-collar of the base and the groove in the half-collar of the cover are aligned to form an encircling groove; and wherein the collar of the adapter has an encircling ring to fit into the encircling ring of the housing.

9. A food forming apparatus as in claim 8, wherein the cover is formed of two pieces; means pivotally mounting one of the cover pieces to the base; and common means clamping both of said cover pieces to the base; and wherein the forming block is removably positioned in the housing and is secured between the distributor and shoulder means formed in the housing.

10. A food forming apparatus as in claim 9, wherein the housing further includes a pair of legs depending therefrom to support a roll of paper; a pair of arms projecting from therebeneath; and a ramp having one end removably attached to the pair of arms.

11. A food forming apparatus comprising a housing having an inlet end and a discharge end; means to secure the inlet end of said housing to the discharge end of a food grinder or extruder; a forming block assembly having an inlet end and an outlet end; said housing having means on the discharge end to slidably receive and secure the inlet end of said forming block thereto, whereby the outlet end of said housing will receive foodstuffs passing through said housing from a food grinder or extruder, and said foodstuffs will pass through the forming block from the inlet end to the outlet end.

12. An improved food forming press as in claim 11 including a groove on the housing partially surrounding the discharge end of the housing and a flange adapted to slide into said groove and partially surrounding the inlet end of the forming block.

13. An improved food forming apparatus as in claim 11 wherein the forming block assembly comprises a casing having means thereon to be slidably secured to the discharge end of the housing and a cartridge with passages therethrough slidably fitted into the casing.

* * * * *